(12) United States Patent
Issaa et al.

(10) Patent No.: US 7,039,180 B1
(45) Date of Patent: May 2, 2006

(54) METHOD AND APPARATUS FOR ENABLING MULTIPLE PROTOCOL COMMUNICATION OVER A NETWORK

(75) Inventors: Michael A. Issaa, Campbell, CA (US); Steven Chow, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1183 days.

(21) Appl. No.: 09/741,950

(22) Filed: Dec. 20, 2000

(51) Int. Cl.
*H04M 1/00* (2006.01)
*H04M 9/00* (2006.01)

(52) U.S. Cl. ............... 379/399.01; 379/93.31; 379/403; 379/413.02; 379/413.03; 379/413.04

(58) Field of Classification Search ............. 379/93.31, 379/399.01–413.04
See application file for complete search history.

(56) References Cited

U.S. PATENT DOCUMENTS

| | | | | |
|---|---|---|---|---|
| 3,848,098 A | * | 11/1974 | Pinel | ............................ 379/402 |
| 6,118,365 A | * | 9/2000 | Petzold et al. | ............... 336/221 |
| 6,137,880 A | * | 10/2000 | Bella | ....................... 379/399.01 |
| 6,212,272 B1 | * | 4/2001 | Herschler et al. | ....... 379/399.01 |
| 6,418,221 B1 | * | 7/2002 | Snow et al. | ............ 379/399.01 |
| 6,744,812 B1 | * | 6/2004 | Anne et al. | ................... 375/222 |
| 6,748,076 B1 | * | 6/2004 | Elo | ............................ 379/402 |
| 6,888,789 B1 | * | 5/2005 | Sakoda et al. | ............... 370/208 |

OTHER PUBLICATIONS

"Transmission and Multiplexing (TM); Access Networks; Asymmetric Digital Subscriber Line (ADSL)—European specific requirements," RTS/TM-06006 (Draft) Version 4a, *European Telecommunications Standards Institute*, Mar., 2000, 52 pages.

* cited by examiner

*Primary Examiner*—Sinh Tran
*Assistant Examiner*—Ramnandan Singh
(74) *Attorney, Agent, or Firm*—Baker Botts L.L.P.

(57) ABSTRACT

A method and apparatus for enabling multiple protocol communication over a network are disclosed. A first circuit communicates first signals in a first frequency band using a first data protocol and attenuates second signals in a second frequency band using a second data protocol. The first data protocol supports a first modulation technique and a second modulation technique. A second circuit communicates the second signals in the second frequency band using the second data protocol.

37 Claims, 2 Drawing Sheets

METHOD AND APPARATUS FOR ENABLING MULTIPLE PROTOCOL COMMUNICATION OVER A NETWORK

TECHNICAL FIELD OF THE INVENTION

This invention relates in general to data communication, and more particularly to a method and apparatus for enabling multiple protocol communication over a network.

BACKGROUND OF THE INVENTION

Integrated service digital network (ISDN) technology and digital subscriber line (XDSL) technology provide higher bandwidth service for the transmission of voice, video and data over existing twisted pair telephone lines. ISDN and XDSL services may be combined on one twisted pair line but some problems may occur. ISDN typically transmits signals using frequencies approximately between 4 $KH_z$ and 80 $KH_z$ while the ADSL standard specifies that signals are to be transmitted approximately between 25 $KH_z$ and 1.1 $MH_z$ or higher. The overlap in frequency may be solved by transmitting ISDN signals at their usual frequencies and restricting XDSL signals to a higher frequency band. Due to the spectral proximity of ISDN and XDSL signals, however, mutual interference may still occur.

SUMMARY OF THE INVENTION

In accordance with the teachings of the present invention, the disadvantages and problems associated with enabling multiple protocol communication over a network have been substantially reduced or eliminated. In a particular embodiment, an integrated services digital network (ISDN) over asymmetric digital subscriber line (ADSL) splitter is disclosed that separates ISDN signals supporting multiple modulation techniques from ADSL signals and provides a closely matched line impedance on an input port and load impedance on an output port for both ISDN modulation techniques.

In accordance with one embodiment of the present invention, an apparatus for enabling multiple protocol communication over a network includes a first circuit that communicates first signals in a first frequency band using a first data protocol and attenuates second signals in a second frequency band using a second data protocol. The first data protocol supports communication using a first modulation technique and a second modulation technique. A second circuit communicates the second signals in the second frequency band using the second data protocol.

In accordance with another embodiment of the present invention, a circuit for enabling multiple protocol communication over a network includes a multi-stage low-pass filter that communicates ISDN signals supporting a first modulation technique and a second modulation technique in a first frequency band and attenuates ADSL signals in a second frequency band. The low-pass filter has a load impedance in the first frequency band approximately between a first value associated with the first modulation technique and a second value associated with the second modulation technique. The circuit further includes a high-pass filter that communicates the ADSL signals in the second frequency band.

In accordance with a further embodiment of the present invention, a method of enabling multiple protocol communication over a network includes receiving an input signal from a communication network. The input signal has a first component associated with a first data protocol and a second component associated with a second data protocol. The first data protocol supports a first modulation technique and a second modulation technique. A first signal in a first frequency band comprises the first component and is communicated to a first communications device through a first output port. The first output port has a load impedance in the first frequency band approximately between a first value associated with the first modulation technique and a second value associated with the second modulation technique. A second signal in a second frequency band comprises the second component and is communicated to a second communications device through a second output port.

Important technical advantages of certain embodiments of the present invention include a splitter that maintains the integrity of a communication network supporting ISDN and ADSL data protocols. The ISDN data protocol supports two separate modulation techniques to transport signals across the communication network and a different line impedance is associated with each modulation technique. The splitter closely matches the load impedance on an ISDN output port with the line impedance on the input port for signals using each modulation technique by providing a load impedance on the ISDN port that is between the line impedances for the two modulation techniques. The splitter, therefore, has little or no impact on the performance of either the ISDN services or the ADSL services since the line impedance of the input port is closely matched with the load impedance on the ISDN port.

Another important technical advantage of certain embodiments of the present invention includes a splitter having an eighth order low-pass filter that has fewer than eight stages. The low-pass filter in the splitter includes four stages having inductive elements. Each stage further includes an additional inductive element connected in series to a capacitive element. The combination of the additional inductive element and the capacitive element provides extra roll-off for each stage and allows a four stage filter to behave like an eighth order filter. The present invention can incorporate these same concepts in filters of higher or lower order.

An additional important technical advantage of certain embodiments of the present invention includes a splitter that prevents undesirable interaction between ISDN and XDSL signals. The splitter includes a low-pass filter that is nearly transparent to ISDN signals having a frequency below approximately 80 $KH_z$. When the frequency of the signal received by the splitter exceeds the cut-off frequency of the low-pass filter, the load impedance on ISDN output port of the low-pass filter increases and the low-pass filter blocks the higher frequency signal from reaching the ISDN output port. The splitter, therefore, isolates an ISDN device coupled to a communication network from the high frequency output of an XDSL device also coupled to the network.

Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
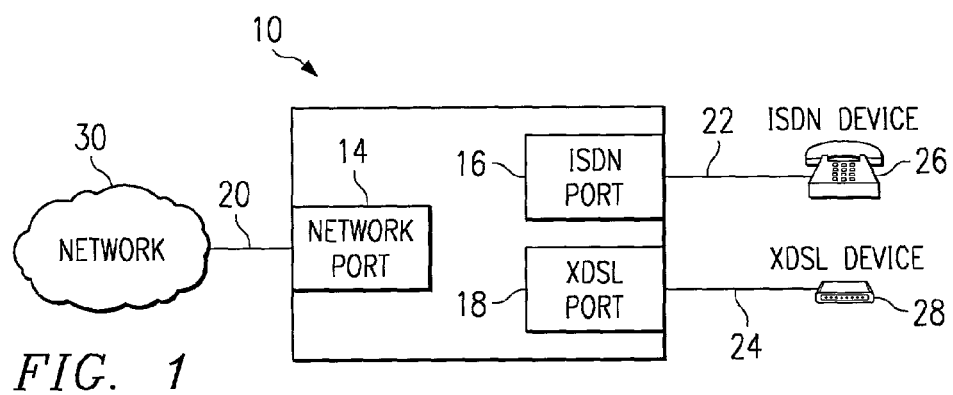
FIG. 1 illustrates a block diagram of a communication network incorporating the present invention.

FIG. 1 illustrates a block diagram of a communication system 10 incorporating integrated services digital network (ISDN) over digital subscriber line (XDSL) splitter 12. System 10 includes splitter 12, network port 14 coupling splitter 12 to network line 20, ISDN line 22 coupling ISDN device 26 to ISDN port 16, and XDSL line 24 coupling XDSL device 28 to XDSL port 18. Splitter 12 enables multiple protocol communication over network 30.

Network 30 supports multiple protocol communication of voice, video and data information. Network 30 may be a packet-based network, such as an internet protocol (IP) network, an asynchronous transfer mode (ATM) network or a frame relay network, a public switched telephone network (PSTN), a local area network (LAN), a wide area network (WAN) or any other suitable network that supports multiple protocol communication of voice, video and data information. System 10 may support communication using protocols such as asymmetric digital subscriber line (ADSL), integrated services digital network (IDSN) DSL, symmetric DSL (SDSL), high-data-rate DSL (HDSL), rate-adaptive DSL (RADSL), very-high-data-rate DSL (VDSL) or any other suitable XDSL technology or other method of transmitting digital data over analog telephone lines, digital ISDN lines, or any other appropriate communication lines.

Network line 20 couples network 30 to network port 14 of splitter 12 and supports simultaneous telephone and data service using twisted pair wiring. Twisted pair wiring is commonly installed at a subscriber premises and as the local loop in many PSTNs. Network line 20 may be unshielded twisted pair (UTP), shielded twisted pair (STP), or other suitable type or category of twisted pair wiring made of copper or any other suitable conductive material. Network line 20 transmits, without limitation, either analog or digital voice signals in a lower frequency band and digital data signals in higher frequency bands. In one embodiment, the lower frequency band includes digital ISDN telephone signals having frequencies below approximately 80 $KH_z$ and the higher frequency band includes ADSL data signals having frequencies above approximately 125 $KH_z$. In another embodiment, the lower frequency telephone signals are analog telephone signals having frequencies below approximately 4 $KH_z$.

ISDN line 22 couples ISDN device 26 to ISDN port 16 of splitter 12 and supports simultaneous voice and data transmission using digital signals. When a telephone call is placed over ISDN line 22, an analog-to-digital converter, either integrated in ISDN device 26 or as a separate unit, converts the analog voice signals to digitized voice signals for transmission across ISDN line 22. Equipment similar to ISDN device 26 at the receiving end of the telephone call converts the digitized voice signals back to analog voice signals with a digital-to-analog converter. In a communication network supporting ISDN, the digitized voice information passes through network 30 without being processed by analog digitizers because devices on either end of the telephone call contain the necessary circuitry to communicate and receive digitized voice information. ISDN device 26 may be a digital telephone, an ISDN data terminal, a group IV fax machine, an ISDN-equipped computer, or any other communications device adapted to transmit and receive digital signals. In an alternative embodiment, a terminal adapter (TA) may be added to a conventional telephone, analog modem, or any other communications device that does not conform to ISDN standards to communicate over ISDN line 22.

Basic Rate ISDN (BRI) provides a subscriber with two bearer channels (B-channels) and one delta channel (D-channel). The two B-channels transmit digital data, fax signals, digitized voice signals and video traffic at 64 Kbps. Each B-channel is a separate communication circuit and a single ISDN line may support simultaneous two-way communication for two devices. For example, the subscriber can simultaneously use one line for standard telephony and the other for data communication. Additionally, the two B-channels may be linked into a single logical circuit that supports data rates of up to 128 Kbps. The D-channel operates at 16 Kbps and provides signaling information for the communication occurring on the B-channels. The signaling information may include the information needed to connect or disconnect a call and to negotiate special calling parameters. The D-channel may also carry packet-switched data using the X.25 protocol or any other suitable protocol used to transmit packets of information through a network.

In different areas of the world, ISDN services use different modulation techniques. North American communication networks typically use two binary one quaternary (2B1Q) coding. 2B1Q combines two bits at a time to form a single quaternary line state. Each combination of bits represents one of four amplitude levels on the line. 2B1Q has a baud rate of approximately 80 Kbaud and operates with a maximum frequency range of 40 $KH_z$. Europe and other parts of the world use the four binary three ternary (4B3T) modulation technique to transport signals in a network supporting ISDN services. 4B3T combines four bits to represent three ternary line signal states: a positive pulse, a negative pulse and a zero state representing no pulse.

XDSL line 24 couples XDSL device 28 to XDSL port 18 of splitter 12 and supports simultaneous voice and data transmission over twisted pair wiring. XDSL technology provides digital data service using existing twisted pair wiring without interrupting normal telephone service. XDSL transmits digital data signals simultaneously with analog or digital voice information by using a separation technique, such as frequency division multiplexing (FDM). FDM creates two different bands for frequencies, one for upstream data and the other for downstream data. Both bands may be divided by time division multiplexing (TDM) into one or more high-speed channels and one or more low-speed channels. FDM separates frequencies that provide telephone service from those frequencies that provide data service. Dynamic noise cancellation techniques and a guard band located between the telephone frequency range and the data frequency range ensure reliable and simultaneous access to data and phone service over XDSL line 24. For example, a subscriber at a premises may simultaneously engage in both a data communication session using XDSL device 28 and a voice conversation using a device such as a conventional telephone or an ISDN telephone.

XDSL device 28 may be an XDSL router, an XDSL modem or any other device configured to communicate XDSL data signals. In one embodiment, XDSL device 28 supports XDSL communication over XDSL line 24 using techniques, such as discrete multitone (DMT) modulation, that comply with ANSI standard T1.413. DMT modulation discretely divides the available frequencies on XDSL line 24 into subchannels or tones. Incoming data signals are broken down into a variety of bits and distributed to a specific combination of subchannels based on the subchannels, ability to carry the transmission. In an alternative embodiment, XDSL communication over XDSL line 24 may be performed using a carrier-less amplitude phase (CAP) modulation technique. CAP modulation generates a modulated wave that carries amplitude and phase state changes by storing parts of a modulated message signal in memory and reassembling the parts in the modulated wave. In further embodiments, any other suitable modulation technique may be used to support XDSL communication over XDSL line 24.

In one embodiment, network 30 supports ADSL communication over network line 20. In ADSL technology, data received by the end-user, generally referred to as downstream data, is transmitted at a higher rate than data transmitted by the end-user, generally referred to as upstream data. The different transmission rates for upstream and downstream data allow for high bandwidth communication for information being downloaded by the end-user, while still providing lower bandwidth communication for information being uploaded by the end-user. ADSL communication is well adapted for applications, such as video-on-demand, multimedia, and Internet access, which transfer large volumes of information to a modem located at a premises in response to shorter requests for information to a modem located at a remote location. Typical downstream data transmission rates in an ADSL system may range from 256 Kbps or lower to 8 Mbps or higher, and typical upstream rates may range from 128 Kbps or lower to 1.5 Mbps or higher. Maximum data transmission rates are typically achieved at distances of up to approximately 10,000 to 12,000 feet using a standard 24-gauge twisted pair wire. XDSL transmission rates also depend on the specific XDSL technology used, the quality and length of twisted pair wiring, and the contribution of noise and distortion from other components throughout the system.

Splitter 12 separates ISDN signals from XDSL signals transmitted over network line 20 and communicates ISDN signals over ISDN line 22 and XDSL signals over XDSL line 24. More specifically, splitter 12 includes a low-pass filter that communicates ISDN signals on network line 20 to ISDN device 26 over ISDN line 22 and attenuates the higher frequency XDSL signals on line 20. Splitter further includes a high-pass filter that communicates the higher frequency XDSL signals on line 20 to XDSL device 28 over XDSL line 24.

In a communication network containing both ISDN devices and XDSL devices, mutual interference may occur due to the spectral proximity of ISDN signals in a lower frequency band and XDSL signals in a higher frequency band. This interference may degrade the performance of both the ISDN and XDSL services. Splitter 12 eliminates the mutual interference by isolating ISDN device 26 from XDSL device 28. For example, when splitter 12 receives an ISDN signal on network line 20, the low-pass filter communicates the ISDN signal to ISDN port 16 and the high-pass filter blocks the ISDN signal from being transmitted to XDSL port 18. Thus, splitter 12 provides spectral separation for the ISDN and XDSL signals while allowing multiple protocol communication to occur over network 30. Low-pass filter in splitter 12 provides the appropriate spectral separation because the cutoff frequency is set so that it is above the transmission band for ISDN signals but below the transmission band for XDSL signals.

Although conventional filters may provide spectral separation, they may cause signal distortion when added to a communication network. Splitter 12 eliminates the distortion caused by conventional filters because the low-pass filter provides a closely matched line impedance on network port 14 and load impedance on ISDN port 16. The closely matched line impedance on network port 14 and load impedance on ISDN port 16 allows the splitter to be nearly transparent for signals below the cutoff frequency of the low-pass filter. Since the low-pass filter is nearly transparent for ISDN signals, splitter 12 does not degrade or distort the ISDN signals and therefore, does not disrupt the ISDN services provided over network 30.

Figure 2:
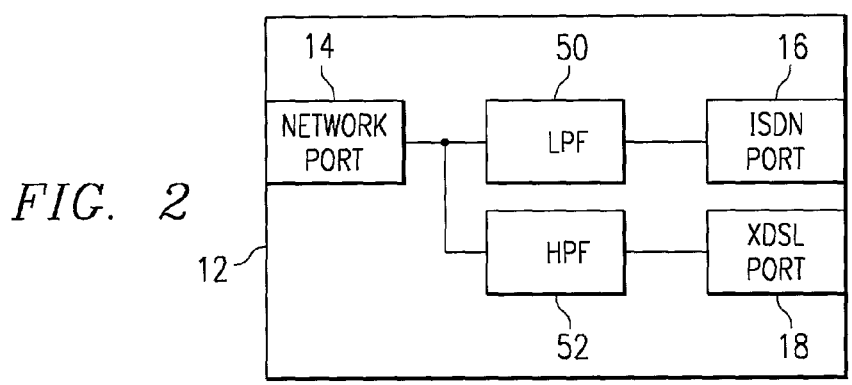
FIG. 2 illustrates a block diagram of an ISDN over XDSL splitter according to the present invention.

FIG. 2 illustrates a block diagram of ISDN over XDSL splitter 12. Splitter 12 includes low-pass filter 50, high-pass filter 52, network port 14, ISDN port 16 and XDSL port 18. Network port 14, ISDN port 16 and XDSL port 18 may be female RJ-11 phone jacks or any other equivalent jack for coupling splitter 12 to twisted pair wiring.

Low-pass filter 50 isolates ISDN device 26 from high frequency output from XDSL device 28 and eliminates disruptions to XDSL services. Low-pass filter 50 communicates the lower-frequency ISDN signals from network port 14 to ISDN port 16 and filters out any higher-frequency XDSL signals. Low-pass filter 50 also prevents ISDN signals having frequencies above approximately 80 $KH_z$ from being communicated to network port 14 and/or XDSL port 18, which eliminates disruption of XDSL services due to energy over spill of ISDN signals 22. Furthermore, low-pass filter 50 may prevent noise associated with the XDSL data signals from unduly interfering with the operation of ISDN device 26, while also preventing higher frequency interference or noise associated with ISDN device 26 from unduly interfering with the XDSL data signals. Low-pass filter 50 performs these functions while reducing or eliminating losses and interference associated with previous filtering devices.

In one embodiment, low-pass filter 50 may be a passive low-pass filter that communicates ISDN signals below approximately 80 KHz and attenuates XDSL signals above approximately 125 KHz, although any appropriate filtering may be performed. Low-pass filter 50 may filter signals sent to ISDN device 26 from network 30 and signals sent from ISDN device 26 to network 30. Low-pass filter 50 may use any components appropriate for a passive low-pass filter including, but not limited to, inductors, resistors, and capacitors.

High-pass filter 52 attenuates ISDN signals having a frequency lower than approximately 100 $KH_z$ and communicates XDSL signals having a frequency greater than approximately 125 $KH_z$ to XDSL port 18 of splitter 12. High-pass filter 52 may provide filtering for signals sent to XDSL device 28 from network 30 and signals sent from XDSL device 28 to network 30. High-pass filter 50 may use any components appropriate for a passive high-pass filter including, but not limited to, inductors, resistors, and capacitors. Although high-pass filter 52 is shown in FIG. 2 as being separate from XDSL device 28, high-pass filter 52 may be fully integrated in XDSL device 28, integrated in both splitter 12 and XDSL device 28 or fully integrated in splitter 12 according to particular needs.

Figure 3:
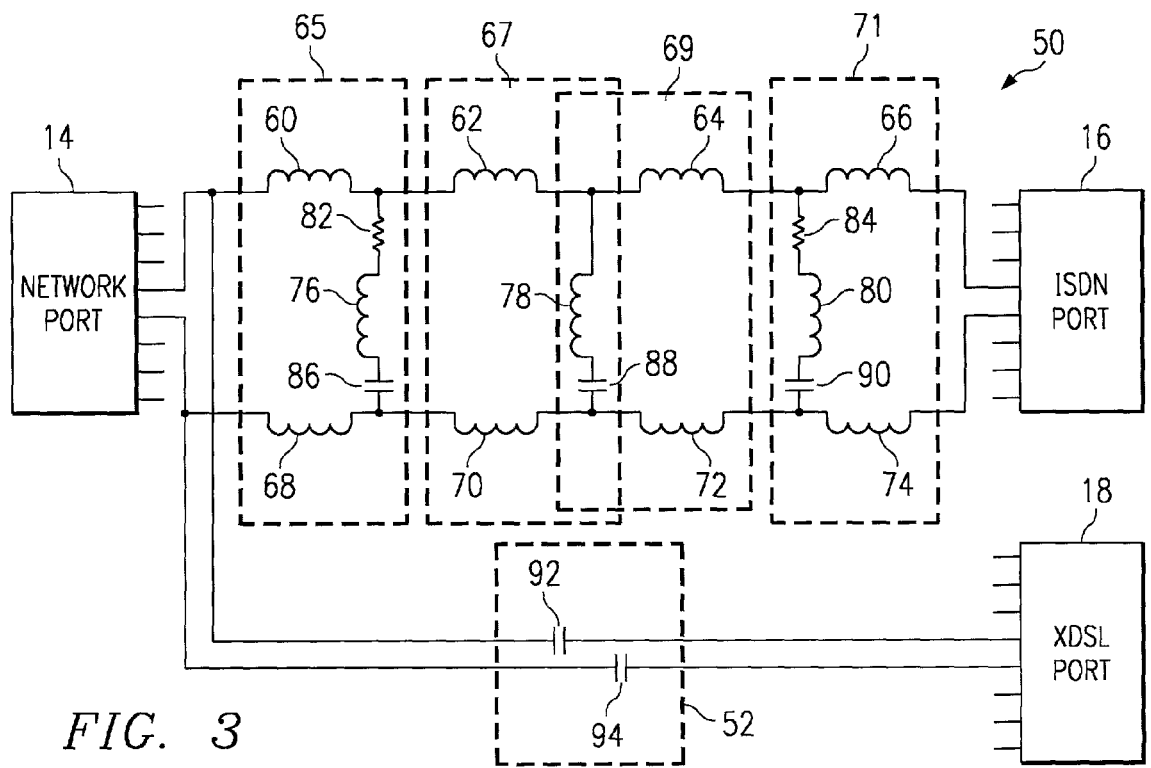
FIG. 3 illustrates a circuit diagram of the ISDN over XDSL splitter.

FIG. 3 illustrates a circuit diagram of ISDN over XDSL splitter 12. Splitter 12 includes low-pass filter 50, high-pass filter 52, network port 14, ISDN port 16 and XDSL port 18. Splitter 12 contemplates any other suitable circuit arrangements. In particular, low-pass filter 50 and high-pass filter 52 may include suitable additional, alternative, or omitted elements, and the elements may have any suitable values, the specific values described with this FIG. 3 being merely exemplary.

In one embodiment, low-pass filter 50 is an eighth order Butterworth filter that includes stages 65, 67, 69 and 71 that couple to the tip and ring wires of twisted pair lines between network line 20 and ISDN line 22. Each stage 65, 67, 69 and 71 functions to provide approximately 40 dB of attenuation. Conventional eighth order filters have eight stages that provide approximately 20 dB of attenuation per stage. Low-pass filter 50 is designed with dipoles (e.g., LC circuits) that provide an extra 20 dB of attenuation per stage and allow an eighth order filter to be constructed with fewer than eight stages.

In one embodiment, stage 65 includes inductive elements 60, 68 and 76, resistive element 82 and capacitive element 86. Inductive element 60 couples to the tip wire of network line 20 and inductive element 68 couples to the ring wire of network line 20. Resistive element 82 couples in series between inductive element 60 and inductive element 76 and capacitive element 86 couples in series between inductive element 68 and inductive element 76.

Stage 67 includes inductive elements 62, 70 and 78, and capacitive element 88. Inductive element 62 couples in series to inductive element 60 in stage 65 on the tip wire of network line 20 and inductive element 70 couples in series to inductive element 68 in stage 65 on the ring wire of network line 20. Inductive element 78 couples in series to inductive element 62 and capacitive element 88 couples in series between inductive element 78 and inductive element 70.

Stage 69 includes inductive elements 64, 72 and 78, and capacitive element 88. Inductive element 64 couples in series to inductive element 62 in stage 67 on the tip wire of network line 20 and inductive element 72 couples in series to inductive element 70 in stage 67 on the ring wire of network line 20. Inductive element 78 couples in series to inductive elements 62 and 64, and capacitive element 88 couples in series between inductive element 78 and inductive elements 70 and 72. In one embodiment, inductive element 78 and capacitive element 88 are shared by stages 67 and 69.

Stage 71 includes inductive elements 66, 74 and 80, capacitive element 90 and resistive element 84. Inductive element 66 couples in series to inductive element 64 in stage 69 on the tip wire of network line 20 and inductive element 74 couples in series to inductive element 72 in stage 69 on the ring wire of network line 20. Resistive element 84 couples in series between inductive elements 64 and 66, and inductive element 80 and capacitive element 90 couples in series between inductive elements 72 and 74, and inductive element 80.

In one embodiment, inductive elements 60, 66, 68, 74 and 78 may be 100 µH inductors and inductive elements 62, 64, 70 and 72 may be 150 µH inductors. Inductive elements 76 and 80 respectively may be 22 µH and 68 µH inductors. Resistive elements 82 and 84 may be 10.7 Ω resistors and capacitive elements 86, 88 and 90 respectively may be 14.7 pF, 12.2 pF and 13.3 pF capacitors. In alternative embodiments, the values for the inductors, capacitors and resistors may be any value that provides approximately 40 dB of roll-off in each of stages 65, 67, 69 and 71.

In one embodiment, high-pass filter 52 may be DC-decoupled all-pass filter that includes two capacitive elements 92 and 94. The DC-decoupled all-pass filter may be used with XDSL devices that contain sufficient high-pass filtering built into the device. Capacitive element 92 couples in series between network port 14 and XDSL port 18 on the tip wire of network line 20 and capacitive element 94 couples in series between network port 14 and XDSL port 18 on the ring wire of network line 20. In one embodiment, capacitive elements 92 and 94 may be 47 pF capacitors. In alternative embodiments, high-pass filter may be first order high-pass filter for use with XDSL devices that may not contain high-pass filters built into the device.

Figure 4:
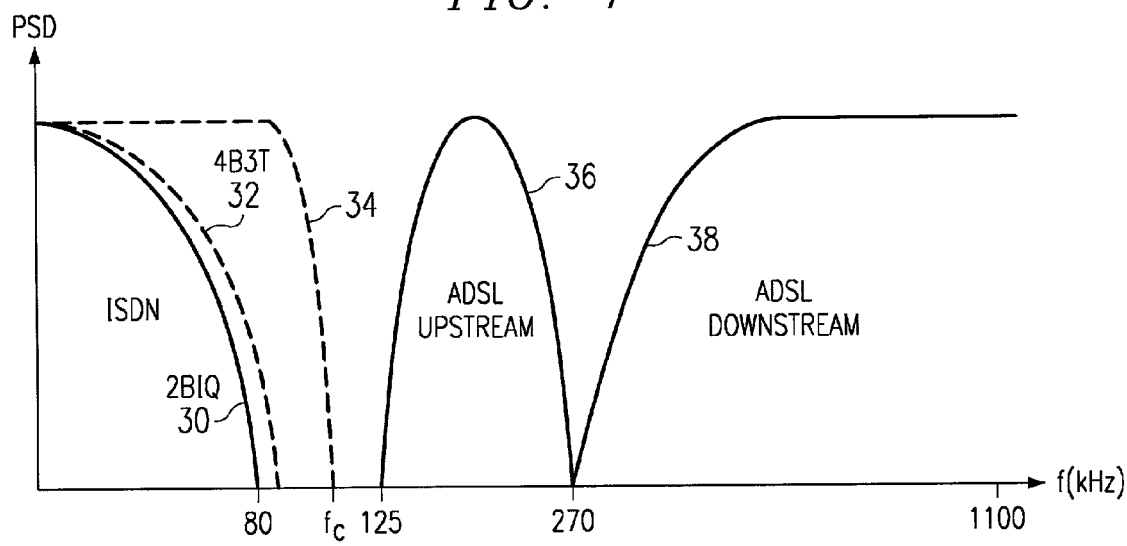
FIG. 4 illustrates a graph of the transmission characteristics of the ISDN over XDSL splitter.

In operation, FIG. 4 illustrates a graph of the transmission characteristics of ISDN over XDSL splitter 12, as reflected on ISDN line 22 and XDSL line 24. ISDN line 22 may communicate digital data and digitized voice signals using two different modulation techniques. ISDN line 22 communicates signals in 2B1Q ISDN frequency band 30 using the 2B1Q modulation technique and ISDN line 22 further communicates signals in 4B3T ISDN frequency band 32 using the 4B3T modulation technique. As illustrated, signals in 4B3T ISDN frequency band 32 may be transmitted at higher frequencies than signals in 2B1Q ISDN frequency band 30. In one embodiment, ISDN signals in 2B1Q ISDN frequency band 30 have frequencies approximately below 80 $KH_z$ and ISDN signals in 4B3T ISDN frequency band 32 have frequencies approximately below 100 KHz. Frequency band 34 represents the pass-band of low-pass filter 50, which communicates an ISDN signal using the 2B1Q or 4B3T modulation techniques from network line 20 to ISDN line 22 but blocks XDSL signals at frequencies above approximately 125 $KH_z$. In one embodiment, low pass filter 50 may be an eighth order low-pass filter having a cut-off frequency of approximately 100 $KH_z$. The eighth order low-pass filter may provide a steep roll-off slope to prevent noise on higher frequency ISDN signals in the 4B3T ISDN frequency band 32 from interfering with lower frequency XDSL signals in XDSL frequency band 35 and block the noise from being communicated to XDSL port 18. The steep slope also provides spectral separation between ISDN signals transmitted in 2B1Q frequency band 30 and 4B3T frequency band 32, and ADSL signals transmitted in ADSL upstream frequency band 36 and isolates ISDN device 26 from XDSL device 28. By isolating ISDN device 26 and XDSL device 28, splitter 12 preserves the integrity of the ISDN and XDSL services supported by network 30.

In one embodiment, XDSL line 24 may support communication using the ADSL data protocol and transmit signals in ADSL upstream frequency band 36 and ADSL downstream frequency band 38. Signals in ADSL upstream frequency band 36 are transmitted from a subscriber to a data service provider and signals in ADSL downstream frequency band 38 are received by the subscriber from a data service provider. In one embodiment, upstream frequency band 36 generally extends from approximately 125 $KH_z$ to approximately 270 $KH_z$ and downstream frequency band 38 generally extends from approximately 270 $KH_z$ to 1.1 $MH_z$ or higher. High-pass filter 52 communicates XDSL signals at frequencies above 125 $KH_z$ and blocks lower frequency ISDN signals using either modulation technique from being communicated to XDSL port 18.

Figure 5:
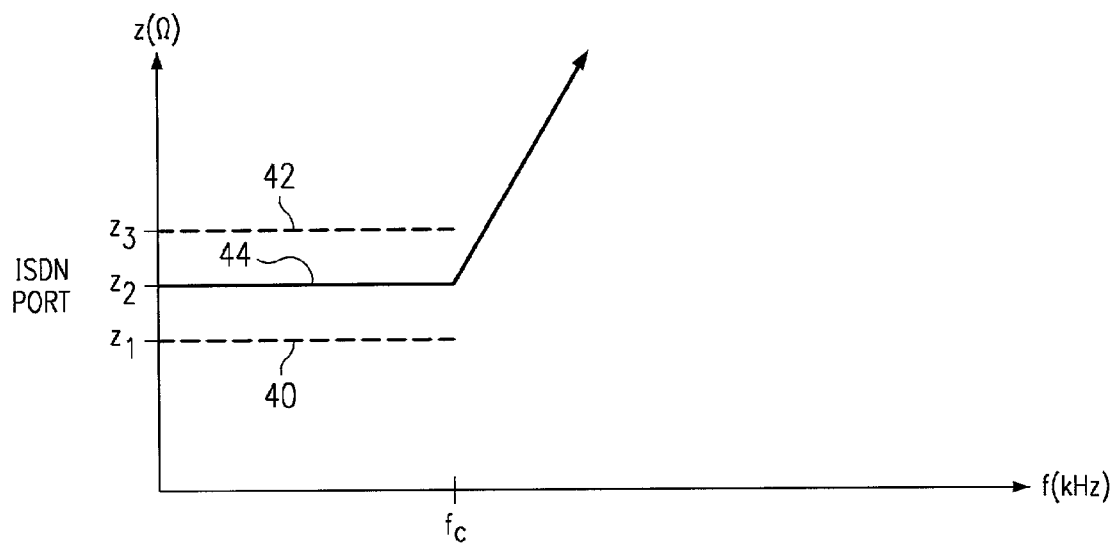
FIG. 5 illustrates a graph of the load impedance characteristics of the ISDN over XDSL splitter.

FIG. 5 illustrates a graph of the line impedance characteristics of network line 20. As illustrated, 4B3T line impedance 40 represents the characteristic line impedance of network line 20 when transmitting an ISDN signal using the 4B3T modulation technique and 2B1Q line impedance 42 represents the characteristic line impedance of network line 20 when transmitting an ISDN signal using the 2B1Q modulation technique. Load impedance 44 represents the load impedance of ISDN port 16.

In a conventional network, a splitter should have minimal or no impact on the performance of the services supported by the network. In order to have a low impact on the network, a filter should be near transparent for signals in a specific pass band. In one embodiment, splitter 12 is near transparent between network port 14 and ISDN port 16. Splitter 12 may be near transparent if the transfer function in frequency band 34 is approximately 0 dB and the line impedance on network port 14 is approximately the same as the load impedance on ISDN port 16. In one embodiment for frequencies below the cut-off frequency of low-pass filter 50, 4B3T line impedance 40 may be approximately 130 Ω, 2B1Q line impedance 42 may be approximately 145 Ω and load impedance 44 may be approximately 135 Ω. Splitter 12 provides load impedance 44 on ISDN port 16 that is between 4B3T line impedance 40 and 2B1Q line impedance 42 and closely matches the load impedance on ISDN port 16 with the line impedance seen on network port 14 for either the 2B1Q or 4B3T modulation technique. Since splitter 12 has a closely matched line impedance on network port 14 and load impedance on ISDN port 16, splitter 12 is near transparent for ISDN signals in frequency band 34 below the cut-off frequency of low-pass filter 50.

When signals on network line 20 have a frequency above the cut-off frequency of low-pass filter 50, load impedance 44 increases due to the combination of elements within low-pass filter 50 and low-pass filter 50 attenuates the signals to prevent them from reaching ISDN line 22 over ISDN port 16. Since no signals with frequencies greater than the cut-off frequency of low-pass filter 50 may be transmitted to ISDN line 22, splitter 12 isolates ISDN device 26 from XDSL device 28 and prevents mutual interference between ISDN and XDSL signals. Although not shown in FIG. 5, the load impedance of XDSL port 18 is approximately 100 Ω for frequencies above the cut-off frequency of low-pass filter 50 and closely matches the line impedance of network line 20 when transmitting ADSL signals.

Although the present invention has been described in detail, it should be understood that various changes, substitutions, and alterations can be made without departing from the spirit and scope of the invention as defined by the appended claims.

What is claimed is:

1. An apparatus for enabling multiple protocol communication over a network, comprising:
    a first circuit operable to communicate first signals in a first frequency band using a first data protocol and to attenuate second signals in a second frequency band using a second data protocol, the first data protocol supporting a first modulation technique and a second modulation technique, wherein the first circuit has a load impedance in the first frequency band between a first value -associated with the first modulation technique and a second value associated with the second modulation technique; and
    a second circuit operable to communicate the second signals in the second frequency band using the second data protocol.

2. The apparatus of claim 1, wherein the first circuit has a load impedance in the first frequency band approximately equal to 135 Ω.

3. The apparatus of claim 1, wherein the first circuit has a load impedance in the first frequency band approximately equal to 135 Ω, the load impedance being between a first value associated with the first modulation technique and a second value associated with the second modulation technique, the first value approximately equal to 130 Ω and the second value approximately equal to 145 Ω.

4. The apparatus of claim 1, wherein the first circuit is a multistage low-pass filter comprising a plurality of stages, each stage contributing a substantially similar frequency roll-off.

5. The apparatus of claim 1, wherein the first circuit is a multistage low-pass filter comprising a plurality of stages, each stage contributing approximately 40 dB frequency roll-off below 100 $KH_z$.

6. The apparatus of claim 1, further comprising:
    an input port coupled to the first and second circuits, the input port operable to couple to a network;
    a first output port coupled to the first circuit, the first output port operable to communicate the first signals in the first frequency band using the first data protocol; and
    a second output port coupled to the second circuit, the second output port operable to communicate the second signals in the second frequency band using the second data protocol.

7. The apparatus of claim 6, wherein the first circuit is a multistage low-pass filter comprising:
    a first stage coupled to the input port;
    a second stage coupled to the first stage;
    a third stage coupled to the second stage; and
    a fourth stage coupled between the third stage and the first output port, the first, second, third and fourth stages comprising:
        a first inductive element;
        a second inductive element coupled in parallel to the first inductive element;
        a third inductive element coupled in series to the first inductive element; and
        a capacitive element coupled in series between the third inductive element and the second inductive element;
        the third inductive element and the capacitive element shared by the second and third stages; and
        the first inductive element operable to couple to a tip wire of a twisted pair line and the second inductive element operable to couple to a ring wire of the twisted pair line.

8. The apparatus of claim 7, wherein the first and fourth stages further comprise a resistive element coupled in series between the first and third inductive elements.

9. The apparatus of claim 6, wherein the second circuit is a DC-decoupled pass filter, the DC-decoupled pass filter comprising:
    a first capacitive element coupled in series between the input port and the second output port;
    a second capacitive element coupled in series between the input port and the second output port; and
    such that the first capacitive element is operable to couple to a tip wire of a twisted pair line the second capacitive element is operable to couple to the ring wire of the twisted pair line.

10. The apparatus of claim 1, wherein the first circuit is an eighth order low-pass filter having a cutoff frequency of approximately 100 $KH_z$.

11. The apparatus of claim 1, wherein the first data protocol is ISDN and the second data protocol is XDSL.

12. The apparatus of claim 1, wherein:
    the first frequency band comprises a range within approximately 25 $KH_z$ to approximately 80 $KH_z$; and
    the second frequency band comprises a range within approximately 125 $KH_z$ to approximately 1.1 $MH_z$.

13. The apparatus of claim 1, wherein:
    the first modulation technique is 4B3T; and
    the second modulation technique is 2B1Q.

14. A circuit for enabling multiple protocol communication over a network, comprising:
 a multi-stage low-pass filter operable to communicate ISDN signals in a first frequency band supporting a first modulation technique and a second modulation technique and attenuate XDSL signals in a second frequency band, the low-pass filter having a load impedance in the first frequency band approximately between a first value associated with the first modulation technique and a second value associated with the second modulation technique; and
 a high-pass filter operable to communicate the XDSL signals in the second frequency band.

15. The circuit of claim 14, wherein the load impedance of the low-pass filter is approximately equal to 135 Ω, the load impedance being between the first value associated with the first modulation technique and the second value associated with the second modulation technique, the first value approximately equal to 130 Ω and the second value approximately equal to 145 Ω.

16. The circuit of claim 14, wherein the multistage low-pass filter comprises a plurality of stages, each stage contributing a substantially similar frequency roll-off.

17. The circuit of claim 14, wherein the multistage low-pass filter comprises:
 a first stage;
 a second stage coupled to the first stage;
 a third stage coupled to the second stage; and
 a fourth stage coupled to the third stage, the first, second, third and fourth stages comprising:
  a first inductive element;
  a second inductive element coupled in parallel to the first inductive element;
  a third inductive element coupled in series to the first inductive element;
  a capacitive element coupled in series between the third inductive element and the second inductive element; and
  such that the second and third stages share the third inductive element and the capacitive element.

18. The circuit of claim 17, wherein:
the first and fourth stages further comprise a resistive element coupled in series between the first inductive element and the third inductive element.

19. The circuit of claim 18, wherein:
the first, second and third inductive elements comprise inductors of between approximately 20 μH to approximately 150 μH;
the capacitive element comprises a capacitor of between approximately 12 μF to approximately 15 μF; and
the resistive element comprises a resistor of between approximately 10 Ω to approximately 15 Ω.

20. The circuit of claim 14, wherein the high-pass filter comprises:
 a first capacitive element; and
 a second capacitive element coupled in parallel with the first capacitive element.

21. The circuit of claim 20, wherein the first and second capacitive elements comprise capacitors approximately of 47 pF.

22. The circuit of claim 14, wherein:
the first frequency band comprises a range within approximately 25 $KH_z$ to approximately 80 $KH_z$; and
the second frequency band comprises a range within approximately 125 $KH_z$ to approximately 1.1 $MH_z$.

23. The circuit of claim 14, wherein:
the first modulation technique is 4B3T; and
the second modulation technique is 2B1Q.

24. A method for enabling multiple protocol communication over a network, comprising:
 receiving an input signal from a network, the input signal having a first component associated with a first data protocol and a second component associated with a second data protocol, the first data protocol supporting a first modulation technique and a second modulation technique;
 communicating a first signal in a first frequency band comprising the first component to a first communications device through a first output port, the first output port having a load impedance in the first frequency band approximately between a first value associated with the first modulation technique and a second value associated with the second modulation technique; and
 communicating a second signal comprising the second component in a second frequency band to a second communications device through a second output port.

25. The method of claim 24, wherein the load impedance of the first output port is approximately equal to 135 Ω, the load impedance being between the first value associated with the first modulation technique and the second value associated with the second modulation technique, the first value approximately equal to 130 Ω and the second value approximately equal to 145 Ω.

26. The method of claim 24, wherein the first data protocol is ISDN and the second data protocol is XDSL.

27. The method of claim 24, wherein:
the first frequency band comprises a range within approximately 25 $KH_z$ to approximately 80 $KH_z$; and
the second frequency band comprises a range within approximately 125 $KH_z$ to approximately 1.1 $MH_z$.

28. The method of claim 24, wherein:
the first transport mechanism is 4B3T; and
the second transport mechanism is 2B1Q.

29. The method of claim 24, wherein:
the first communications device is an ISDN telephone; and
the second communications device is an XDSL router.

30. An apparatus for enabling multiple protocol communication over a network, comprising:
 means for receiving an input signal from a network, the input signal having a first component associated with a first data protocol and a second component associated with a second data protocol, the first data protocol supporting a first modulation technique and a second modulation technique, wherein the first output port has a load impedance in the first frequency band approximately between a first value associated with the first modulation technique and a second value associated with the second modulation technique;
 means for communicating a first signal in a first frequency band comprising the first component to a first communications device through a first output port; and
 means for communicating a second signal in a second frequency band comprising the second component to a second communications device through a second output port.

31. The apparatus of claim 30, wherein the first output port has a load impedance in the first frequency band approximately equal to 135 Ω.

32. The method of claim 30, wherein the first output port has a load impedance in the first frequency band approximately equal to 135 Ω, the impedance being between a first value associated with the first modulation technique and a second value associated with the second modulation technique, the first value approximately equal to 130 Ω and the second value approximately equal to 145 Ω.

33. The apparatus of claim 30, wherein the means for communicating the first signal in the first frequency band is a multistage low-pass filter comprising a plurality of stages, each stage contributing a substantially similar frequency roll-off.

34. The apparatus of claim 30, wherein the means for communicating the second signal in the second frequency band is a DC-decoupled pass filter.

35. The apparatus of claim 30, wherein the first data protocol is ISDN and the second data protocol is XDSL.

36. The apparatus of claim 30, wherein:
the first frequency band comprises a range within approximately 25 $KH_z$ to approximately 80 $KH_z$; and
the second frequency band comprises a range within approximately 125 $KH_z$ to approximately 1.1 $MH_z$.

37. The apparatus of claim 30, wherein:
the first data protocol is ISDN and the second data protocol is XDSL; and
the first modulation technique associated with ISDN is 4B3T and the second modulation technique associated with ISDN is 2B1Q.

* * * * *